No. 64,714. PATENTED MAY 14, 1867.
B. A. SHAFFER.
MODE OF MAKING DRAINING TILE.
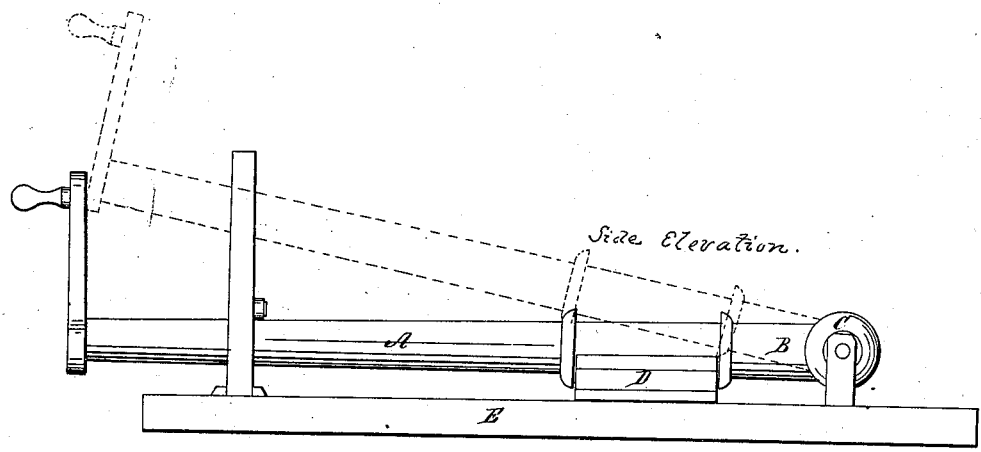
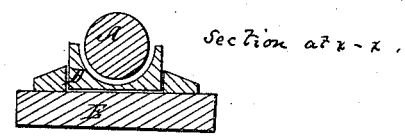
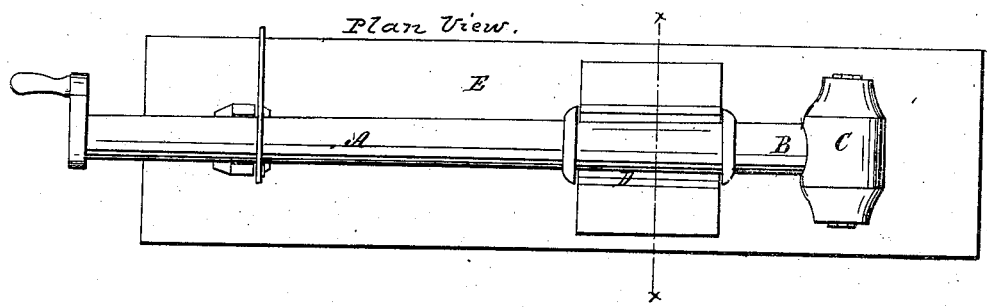
Witnesses:
J. H. Phillips
Geo. C. Lambright

United States Patent Office.

BENJAMIN A. SHAFFER, OF CASS COUNTY, INDIANA.

Letters Patent No. 64,714, dated May 14, 1867.

MODE OF MAKING DRAINING-TILE.

*The Schedule referred to in these Letters Patent and making part of the same.*

TO ALL WHOM IT MAY CONCERN:

Be it known that I, BENJAMIN A. SHAFFER, of the county of Cass, and State of Indiana, have invented a new and improved mode of making Underground Draining-Tile; and I do hereby declare that the following is a full and exact description thereof, reference being had to the accompanying drawings, and to the letters marked thereon.

The nature of my invention consists in a lever or roller, A, that forms the hollow of the tile, being about five feet long, with a crank on one end, and the other end B fastened in a head-piece in such a position as to allow it to revolve. The head-piece C is also hung on pivots or hinges, so as to turn and allow the lever or roller to be raised or lowered at pleasure. This head is fastened to a sufficient table, bench, or stand, E, and the mould D slides into its proper place under the lever or roller. The lever being wet is let down into the mould filled with clay, and then turned by means of the crank which forms the tile. The lever is then raised, the mould drawn back, and the tile turned out, in a manner somewhat similar to that of moulding brick.

What I claim as my invention, and desire to secure by Letters Patent, is—

The lever or roller, as substantially described above, for making and forming underground draining-tile, the said lever or roller working in a sliding mould, or in any other manner substantially the same.

BENJAMIN A. SHAFFER.

Witnesses:
A. H. EVANS,
R. K. EVANS.